United States Patent [19]

Ernst

[11] 4,413,416
[45] Nov. 8, 1983

[54] MEASURING DEVICE

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 238,638

[22] Filed: Feb. 26, 1981

[30] Foreign Application Priority Data

Mar. 5, 1980 [DE] Fed. Rep. of Germany ....... 3008384

[51] Int. Cl.³ ............................................ G01B 11/02
[52] U.S. Cl. .................................... 33/125 R; 33/403; 33/430
[58] Field of Search ............. 33/125 R, 125 A, 125 B, 33/125 C, 430, 483, 443, DIG. 16, 12, 176, 403; 248/680, 503, 488; 269/91-94; 356/372, 383, 386, 387; 250/237 R, 237 G; 350/110-114

[56] References Cited

U.S. PATENT DOCUMENTS

| 2,651,483 | 9/1953 | Ritchie et al. | 248/680 |
| 2,772,485 | 12/1956 | Gelb | 33/184.5 |
| 2,898,713 | 8/1959 | Jansson | 269/94 X |
| 2,913,830 | 11/1959 | Schroter | 269/93 X |
| 3,579,836 | 5/1971 | Kraus | 33/125 C |
| 3,629,945 | 12/1971 | Liuzzo | 33/125 A X |
| 3,816,003 | 6/1974 | Litke | 33/125 C X |

FOREIGN PATENT DOCUMENTS 350453 3/1922 Fed. Rep. of Germany ........ 33/358

OTHER PUBLICATIONS

Intrementale Langenmessysteme Minilid 300 Minilid 310 Document No. 604605 & 30 2/78/B of the firm of Dr. Juhannes. Heidenhain GmbH, Traunreut, West Germany.

Primary Examiner—Harry N. Haroian
Attorney, Agent, or Firm—Willian, Brinks, Olds, Hofer, Gilson & Lion, Ltd.

[57] ABSTRACT

A fastening apparatus for a measuring device including a bending resistant scale comprises a plurality of resilient fastening elements for mounting the scale to a support surface. Each of these fastening elements is securely mounted to a support surface and acts resiliently to apply a mounting force to the scale, which mounting force is sufficient to hold the scale in place, substantially without distorting the scale. In the illustrated embodiment the mounting force is independent of the force with which the fastening elements are mounted to the support surface.

7 Claims, 1 Drawing Figure

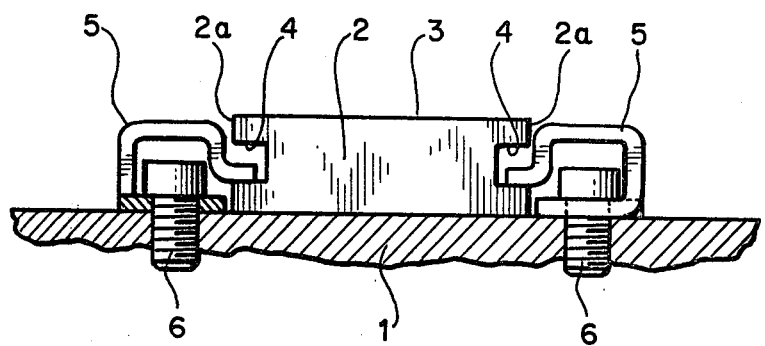

MEASURING DEVICE

BACKGROUND OF THE INVENTION

This invention relates to improvements in precision measuring devices of the type having a bending resistant scale mounted to a support surface, and particularly to improved fastening elements for mounting such a scale.

Precision measuring devices of the type having a bending resistant scale are known to the prior art. For example, U.S. Pat. No. 3,816,003 discloses a scale which is resistant to bending and is positioned in a groove and held in place by means of contact pressure screws. When pressure screws are used to fasten precision scales in place, localized bending of the scale can occur, particularly when the mounting surface is uneven or when deposits build up on the mounting surface. If the measuring division is not positioned in the neutral plane of the scale, such bending can lead to errors in measurement.

SUMMARY OF THE INVENTION

The present invention is directed to an improved scale fastening arrangement which to a large extent overcomes the aforementioned disadvantages of the prior art, and thereby reduces measurement errors.

According to this invention, a measuring device having a bending resistant or rigid scale is provided with a plurality of resilient fastening elements for mounting the scale to a support surface. Each of these fastening elements is securely mounted to the support surface and acts resiliently to apply a mounting force to the scale. This mounting force is sufficient to hold the scale in place, substantially without distorting the scale.

The present invention provides a number of significant advantages. For example, because only precisely proportioned contact pressure forces are applied to the scale by the fastening elements, it is possible to prevent the application of unacceptably large bending loads to the scale. In addition, the fastening arrangement of this invention provides sufficient mounting force to securely fasten the scale in place, and provides a fastening arrangement which is relatively insensitive to the unevenness of typical mounting surfaces. As a result of all of these advantages, the fastening arrangement provides an increased accuracy of measurement.

The invention, together with further objects and attendant advantages, will best be understood by reference to the following detailed description taken in connection with the accompanying drawing.

BRIEF DESCRIPTION OF THE DRAWING

The drawing shows a partial sectional view of a measuring scale of a measuring device, showing a presently preferred embodiment of the present invention.

DETAILED DESCRIPTION OF THE PREFERRED EMBODIMENTS

Referring now to the drawing, the reference numeral 1 is used to indicate a support surface, which can be formed, for example, by the slide piece or the bed of a machine tool or a measuring device (not shown). Mounted on this support surface 1 is a precision measuring scale 2 which carries a measuring division 3 on an outer surface of the scale 2 turned away from the support surface 1. This measuring division 3 is applied to the scale 2 symmetrically with respect to the longitudinal axis of the scale 2, directly on the outer surface of the scale 2. The longitudinal sides 2a of the scale define a plurality of groove type recesses 4 which serve to engage clamp type tension springs 5.

Each of the tension springs 5 is securely fastened by means of fasteners such as screws 6 to the support surface 1. The springs 5 serve to apply a precisely predetermined, resilient mounting force to the scale 2. This mounting force is sufficient to hold the scale 2 securely in place on the support surface 1, but is not great enough to cause localized bending of the scale 2. Because the screws 6 serve merely to hold the springs 5 in place, and not to develop the mounting force, the tightness of the screws 6 has substantially no effect on the magnitude of the mounting force applied to the scale 2. Thus, by properly forming the tension springs 5 it is possible to establish the mounting pressure applied to the scale 2 precisely at the desired value. In this way, the mounting force applied to the scale 2 by the springs 5 is substantially independent of the torque which the screws 6 are tightened.

As explained above, when bending resistant measuring scales are mounted by means of unyielding fastening elements as in the prior art, localized bending of the scale can occur. In large part this is due to the fact that mounting surfaces in actual use are generally not so flat as to insure an absolutely planar mounting surface for the scale. In order to improve the measuring accuracy of such measuring devices it is necessary, however, that actual bending of the scale caused by the mounting of the scale to a support surface be kept as free as possible of small bending radii.

Errors that could arise through lateral bending of the scale 2 are avoided to a large extent by the symmetrical positioning of the measuring division 3 with respect to the longitudinal axis of the scale 2. Furthermore, the formation of the scale 2 causes the resistance to bending of the scale 2 in lateral directions to be about ten times greater than about the transverse axis, perpendicular to the mounting surface 1. Correspondingly, the sensitivity to lateral bending of the scale is reduced.

Of course, it should be understood that various changes and modifications to the preferred embodiment described above will be apparent to those skilled in the art. For example, instead of the clamp type tension springs shown in the drawing it is possible to substitute spring biased rocker arms in the fasteners of this invention. Furthermore, it should clearly be understood that this invention can be used in optical and photo-optical measuring devices, as well as in other types of measuring devices having bending resistant scales. The foregoing description has been provided to illustrate the presently preferred embodiment of this invention, and not to limit the scope of this invention, which is defined not by the foregoing illustration, but by the following claims, including all equivalents.

I claim:

1. In a precision measuring device for measuring the position of a first component with respect to a second component, said measuring device comprising a bending resistant scale, the improvement comprising:
   means, included in the scale, for defining a plurality of recesses in the scale; and
   a plurality of resilient fastening elements for mounting the scale to a support surface defined by one of the first and second components, each of said fastening elements securely mounted to the support surface and positioned to engage a respective one of the recesses to apply a resilient mounting force to the scale acting substantially perpendicularly to the support surface, said mounting force of said fastening elements being sufficient to hold the scale in place, substantially without distorting the scale.

2. The invention of claim 1 wherein at least one of the fastening elements comprises a clamp type tension spring.

3. The invention of claim 1 wherein the scale comprises at least one bending resistant metal body and wherein the scale includes a measuring division applied directly to an outer surface of the at least one metal body, symmetrically with respect to the longitudinal axis of the scale.

4. In a precision measuring device comprising a bending resistant scale, the improvement comprising:
   means, included in the scale, for defining a plurality of recesses in the scale;
   a plurality of resilient, spring biased fastening elements, each fastening element defining a scale contact surface positioned to engage a respective one of the recesses; and
   means for securely mounting the pluarality of resilient fastening elements to a mounting surface such that the scale contact surfaces of the respective fastening elements are held in contact with the scale in engagement with the recesses and each of the fastening elements resiliently exerts a predetermined mounting force on the scale, said predetermined mounting force being sufficient to hold the scale in place, substantially without distorting the scale, the magnitude of said mounting force being substantially independent of the force with which the mounting means mounts the plurality of fastening elements to the mounting surface.

5. The invention of claim 1 wherein the scale defines an upper surface and two opposed side surfaces; wherein the recesses are defined in the side surfaces to extend under the upper surface; wherein the fastening elements fit within the respective recesses; and wherein no part of the fastening elements extends above the upper surface of the scale.

6. The invention of claim 1 wherein the scale comprises a metal scale body, wherein each of the fastening elements comprises a respective metal contact surface, and wherein the metal contact surfaces are positioned to contact and bear directly against the metal scale body.

7. The invention of claim 1 wherein each of the fastening elements comprises an integral, one-piece strip of a resilient material which defines a base section, a side section, and a top section; wherein each of the fastening elements is mounted to the support surface by a respective fastener which engages the base section; wherein the fastener is disposed between the scale and the plane of the side section; wherein the top section defines a contact surface which engages the scale; and wherein a portion of the top section is disposed over the base section.

* * * * *

UNITED STATES PATENT AND TRADEMARK OFFICE
CERTIFICATE OF CORRECTION

PATENT NO. : 4,413,416
DATED : November 8, 1983
INVENTOR(S) : Alfons Ernst

It is certified that error appears in the above-identified patent and that said Letters Patent is hereby corrected as shown below:

On the title page:

IN THE REFERENCES CITED, "OTHER PUBLICATIONS"

Line 1, please delete "Intrementale Langenmessysteme", and substitute therefor --Inkrementale Langenmesssysteme--.

Line 2, please delete "604605 & 30 2/78/B", and substitute therefor --604 605 d 30 2/78 1B--.

Line 3, please delete "Juhannes." and substitute therefor --Johannes--.

IN THE LISTING FOR ATTORNEY, AGENT, OR FIRM

Please delete "Willian, Brinks, Olds, Hofer, Gilson & Lion, Ltd." and substitute therefor --Willian Brinks Olds Hofer Gilson & Lione Ltd.--.

Signed and Sealed this

Ninth Day of April 1985

[SEAL]

Attest:

DONALD J. QUIGG

Attesting Officer     Acting Commissioner of Patents and Trademarks